United States Patent

[11] 3,547,175

[72] Inventor Henri Verdier
 Puy-de-Dome, France
[21] Appl. No. 775,335
[22] Filed Nov. 13, 1968
[45] Patented Dec. 15, 1970
[73] Assignee Compagnie Generale Des Etablissements
 Michelin, raison sociale Michelin & Cie
 Clermont-Terrand, Puy-de-Dome, France
[32] Priority Nov. 15, 1967
[33] France
[31] No. 1893

[54] TIRE COVER
 9 Claims, 1 Drawing Fig.
[52] U.S. Cl. .................................................. 152/209
[51] Int. Cl. ................................................... B60c 11/08
[50] Field of Search ........................................... 152/209

[56] References Cited
UNITED STATES PATENTS
2,324,996  7/1943  Coben .......................... 152/209
2,626,649  1/1953  Eiler et al. .................... 152/209

Primary Examiner—Drayton E. Hoffman
Attorney—Brumbaugh, Graves, Donohue & Raymond ABSTRACT: A tire cover for running on loose and soft ground is formed with V-shaped bars opening in the forward direction and arranged in a staggered pattern around either side of the median plane. The bars are so shaped and positioned as to compress and dry wet soil and automatically to expel, when the tire is run momentarily in the reverse direction, any soil that may be caked between them.

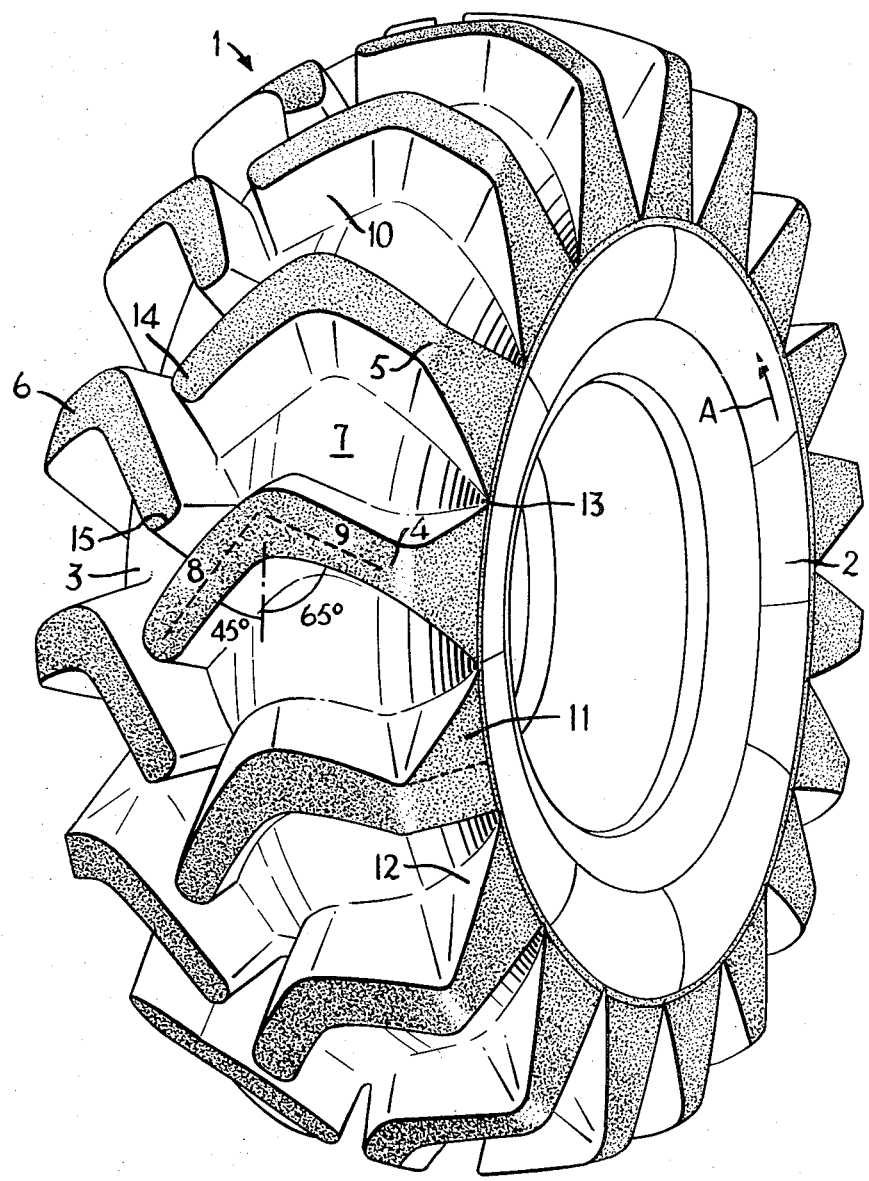

3,547,175

TIRE COVER

BACKGROUND OF THE INVENTION

This invention relates to tire covers and, more particularly, to novel and highly-effective tire covers having outstanding traction on loose and soft ground.

It is well known that, for rolling over loose and soft ground, tires are used the tread of which comprises two rows of sharply projecting bars, arranged obliquely, for example, at 45°, and staggered on either side of the median plane. However, the effectiveness of these bars is limited greatly. The spaces between bars have a tendency to become filled with earth adhering to the tire. Consequently, the tire behaves like a tire with a smooth tread and starts to slide and sink into the ground; moving, both forward and in reverse, becomes impossible. Numerous attempts to improve the arrangement and the shape of the bars have not heretofore resulted in substantial improvement so that, for travel on certain kinds of ground, caterpillars must be used as a remedy.

SUMMARY OF THE INVENTION

An object of the present invention is to eliminate these disadvantages and to provide a tread with bars that assure a better grip on loose and soft ground by compacting of the ground and by drying up of the earth retained between bars. A further object is to make it possible, by moving the vehicle backward, to expel the earth progressively accumulated between the bars.

The tire cover in accordance with the invention comprises in its tread two rows of sharply projecting bars arranged in a staggered pattern on either side of the median plane. Each row covers substantially half of the width of the cover, and each bar has the form of a V open in the forward direction. The branch of each V adjacent to the median plane is inclined approximately 45° with respect to the median plane, while the other branch of each V has a more pronounced crosswise direction and preferably forms an angle of approximately 65° with the direction of the circumference. Each bar comprises on its back surface, adjacent to the shoulder of the tire, an extra thickness that increases in the direction from the peak toward the base of the bar thereby reducing the space between the axially-outer ends of the bars.

BRIEF DESCRIPTION OF THE DRAWING

Additional aspects of the invention may be understood from a consideration of the following detailed description of a representative embodiment thereof in conjunction with the appended drawing, wherein the sole FIG. is a perspective view of a representative tire cover in accordance with the invention.

DESCRIPTION OF THE PREFERRED EMBODIMENT

The drawing shows a tire cover 1 having sidewall 2, another sidewall (not visible) opposite the sidewall 2, and shows a crown 3. The tread of the cover comprises 36 bars of which bars 4, 5, 6 are examples. There are 18 bars identical to bars 4 and 5 disposed in one row and, forming another row, 18 bars identical to bar 6 and mirror images of the bars 4 and 5. Each bar 6 is placed between two bars 4 and 5, and a space 7 is delimited by the bars 4, 5 and 6. Each bar comprises a portion 8 inclined at an angle of 45° to the rolling or longitudinal direction and a portion 9 inclined at an angle of 65° to the rolling direction, as shown in the drawing. These two portions give each bar the shape of a V open in the forward direction: i.e., a V the inner surface 10 of which is the first one to touch the ground in forward movement (indicated by an arrow A). Each bar furthermore comprises an extra thickness of pyramidal shape 11 on its back surface 12 in the region of the shoulder narrowing the space between two consecutive bars, such as 4 and 5. As may be seen, the bars touch at 13, a point located at about midheight of the sidewall 2. Furthermore, the tip 14 of the bar 5 is close to the bar 6, and the tip 15 of the bar 6 is close to the bar 4. The passages between the bars 4 and 6 or 5 and 6 are narrower than the thickness of each of the bars measured perpendicularly to its outline. The circumferential space between the bars 4 and 5 is approximately three times the circumferential thickness of these bars. The height of the bars exceeds their thickness.

The relative movements of the bars 4, 5, 6 when passing over the ground result in that the lateral openings of the compartment 7 are closed and in that the earth when wet is pressed like a sponge, whereby it is compressed and dried underneath the tire which thus can better grip the ground. However, it cannot be avoided that sometimes the earth adheres to the bars and finally comes to fill the space 7. In such a case, the movements, while rolling backward (opposite the direction indicated by the arrow A), of the carcass 3 and the bars 4, 5 loosen the earth, which is subsequently ejected. The loosening and ejection result from an abrupt release of pressure by the pyramid-shaped wedge 11 and from the very rounded cross section of the crown 3.

Thus, it will be seen that the representative tire cover described above is preferably characterized in the following ways:

a. The portion of each bar 4, 5, 6 inclined at 45° covers substantially half of the half-width of the tread while the portion of each bar running at a 65° angle covers substantially the other half of the same half-width of the tread.

b. The thickness of each bar 4, 5, 6, measured perpendicularly to each bar, is substantially constant outside the area of the extra-thick axially-outer end. Measured in the direction of the circumference, the thickness is approximately one-third of the circumferential space between two successive bars.

c. The passages between the portions inclined at 45° and situated on either side of the median plane of the tire are perpendicular to each other and have a width that is less than the thickness of the bars 4, 5, 6.

d. The bars 4, 5, 6 extend laterally or axially beyond the outer limit of each sidewall and join at approximately midheight of each sidewall at their triangular bases.

e. The cover 1 comprises a total of at least 36 bars, half on either side of the median plane.

f. The tire is a radial-carcass-type tire, and its peak reinforcement has a transverse curvature instead of being practically cylindrical.

g. The carcass, whether of the radial or the crossed kind, has a comparatively round cross section. The ratio H/B between the height H and the maximum width B of the carcass is at least 0.9 and preferably close to 1.

The V-bars 4, 5, 6 in accordance with the invention form the borders of cells 7 the lateral openings of which are narrow. The deformation of the tread in the ellipse of contact with the ground produces a drawing together of the bars in contact with the ground. When the cover rolls forward — i.e., in a manner whereby the surface of the bars first to come in contact with the ground is the inner surface of the V — the deformation of the bars produces an additional narrowing, almost a closing of the lateral openings. The earth caught between two successive bars (4 and 5, for example) is compressed in the direction of the bar (6, in the same example) closing the cell space 7 on the side thereof adjacent to the median plane, while the water wrung out is expelled laterally. When the tire rolls backward, the orientation of the branches of the V's with respect to the direction of rolling creates a tendency to loosen and to shift the earth in the direction of the sidewalls. The movements of the carcass after its rolling through the footprint of the tire and of the bars after their deformation by contact with the ground are more violent by reason of the buttressing effect of the bars produced by the extra thickness 11 provided at the base of each bar on its rear surface, which facilitates the loosening and expelling of the earth.

Thus there is provided in accordance with the invention a novel and highly-effective tire cover adapted for use under conditions such that, heretofore, only a caterpillar tread would serve.

The scope of the invention is not exceeded by modification of the details of the preferred embodiment described above. In particular, the preferred angles of 45° and 65° can be modified over a range not differing by more than 20° from these values, provided that a difference of approximately 10° to 30° between them is retained. There can also be modified the ratio of the transverse widths of the tread over which extend the portions of varying inclinations, and the ratio of the area of the elements in relief to the area of the recessed portions of the tread. Preferably, the total area of the V surfaces of all the bars is substantially one-fourth of the surface area of the cover over which the bars are placed and the circumferential spacing of the bars is substantially three times the circumferential thickness of the bars. Finally, the bars can be of variable circumferential thickness or have a more pronounced and variable angle of taper with respect to the carcass.

I claim:

1. A tire cover comprising a pair of sidewalls and a tread portion joined to and extending between said sidewalls, two rows of sharply projecting bars disposed in staggered relation around said tire cover and forming a tread, said rows being on opposite sides of the median plane of the tire and each row covering substantially half the width of the cover, each bar having the shape of a V open in the forward direction, the branch of each V adjacent to the median plane being inclined with respect to that plane by about 45° and the other branch of each V extending in a more nearly transverse direction and forming in angle of about 65° with the direction of the circumference, so that each of the four branches extends in a direction different from the direction in which every one of the other branches extends, and each bar comprising, on its back surface, adjacent to the shoulder of the cover, an extra thickness increasing in a direction from the peak toward the base of the bar, in such a manner as to reduce the space between the ends of the bars adjacent to the shoulder, thereby forming cells which, during rolling of said tire cover over wet soil, facilitate a compression of said soil and a wringing out of water therefrom in order to consolidate said soil and improve the traction of said tire cover.

2. A tire cover according to claim 1 wherein the two branches of each bar extend over substantially equal widths of the tread.

3. A tire cover according to claim 1 wherein the bars of one row and the bars of the other row define passages adjacent to the median plane of the cover having a width less than the thickness of the bars.

4. A tire cover according to claim 1 wherein the bars of a given row are joined by said extra thickness at about mid-sidewall.

5. A tire cover according to claim 1 wherein the ratio of height to maximum width of said cover is above 0.09.

6. A tire cover according to claim 1 wherein the ratio of height to maximum width of said cover is about 1.0.

7. A tire cover according to claim 1 wherein said cover is of the radial type and is formed with a strongly-curved crown.

8. A tire cover according to claim 1 wherein the total number of bars is at least 36, of which half are on either side of the median plane.

9. A tire cover comprising a pair of sidewalls and a tread portion joined to and extending between said sidewalls, two rows of sharply projecting bars disposed in staggered relation around said tire cover and forming a tread, said rows being on opposite sides of the median plane of the tire and each row covering substantially half the width of the cover, each bar having the shape of a V open in the forward direction, the branch of each V adjacent to the median plane being inclined with respect to that plane by about 45° and the other branch of each V extending in a more nearly transverse direction and forming an angle of about 65° with the direction of the circumference, and each bar comprising, on its back surface, adjacent to the shoulder of the cover, an extra thickness increasing in a direction from the peak toward the base of the bar, in such a manner as to reduce the space between the ends of the bars adjacent to the shoulder, the total area of the V surfaces of all the bars being substantially one-fourth of the surface area of the width of the cover over which the bars are placed and the circumferential spacing of the bars being substantially three times the circumferential thickness of the bars.

PO-1050
(5/69)

UNITED STATES PATENT OFFICE
CERTIFICATE OF CORRECTION

Patent No. 3,547,175            Dated December 15, 1970

Inventor(s) Henri Verdier

It is certified that error appears in the above-identified patent and that said Letters Patent are hereby corrected as shown below:

Column 3, line 29, "in" should be -- an -- (amendment filed March 13, 1970, claim 1, line 12); and Column 4, line 12, "0.09" should be -- 0.9 -- (application claim 6, line 3).

Signed and sealed this 22nd day of June 1971.

(SEAL)
Attest:

EDWARD M. FLETCHER, JR.            WILLIAM E. SCHUYLER, JR.
Attesting Officer                       Commissioner of Patents